United States Patent [19]
Chanda

[11] Patent Number: 5,805,675
[45] Date of Patent: Sep. 8, 1998

[54] METHOD AND SYSTEM FOR CREATING A TWO-WAY VOICE PATH TO FACILITATE A CALL PROMPTER/VOICE PROMPTER FEATURE

[75] Inventor: Rajat Chanda, Howell, N.J.

[73] Assignee: Lucent Technologies, Inc., Murray Hill, N.J.

[21] Appl. No.: 908,775

[22] Filed: Aug. 8, 1997

Related U.S. Application Data

[63] Continuation of Ser. No. 300,298, Sep. 2, 1994, abandoned.

[51] Int. Cl.$^6$ .................................................. H04M 11/00
[52] U.S. Cl. ........................ 379/93.14; 379/207; 379/210; 379/229; 379/93.26
[58] Field of Search .................................. 379/93.14, 88, 379/89, 265, 210, 211, 212, 201, 207, 219, 220, 221, 222, 229, 230

[56] References Cited

U.S. PATENT DOCUMENTS

| | | | |
|---|---|---|---|
| 4,939,771 | 7/1990 | Brown et al. ........................... | 379/211 |
| 4,972,461 | 11/1990 | Brown et al. ........................... | 379/89 |
| 5,187,735 | 2/1993 | Herrero Garcia et al. .............. | 379/88 |
| 5,333,180 | 7/1994 | Brown et al. ........................... | 379/89 |
| 5,333,185 | 7/1994 | Burke et al. ............................. | 379/97 |
| 5,384,831 | 1/1995 | Creswell et al. ........................ | 379/88 |
| 5,506,894 | 4/1996 | Billings et al. ......................... | 379/97 |
| 5,509,060 | 4/1996 | Hall et al. ............................... | 379/88 |

*Primary Examiner*—Stella Woo
*Attorney, Agent, or Firm*—Morgan & Finnegan, LLP

[57] ABSTRACT

A system for facilitating a two-way voice path to permit access to call prompter/voice prompter services regardless of the internal system protocols. The system includes a switch for receiving an initial address. The switch including the ability to transmit a query to a control point including subscriber services, wherein the control point including is able to instruct the switch to open a two-way voice path for user-network interaction. The switch is able to open a two-way voice path after receiving instructions from the control point.

32 Claims, 6 Drawing Sheets

METHOD AND SYSTEM FOR CREATING A TWO-WAY VOICE PATH TO FACILITATE A CALL PROMPTER/VOICE PROMPTER FEATURE

This is a continuation of application Ser. No. 08/300,298, filed on Sep. 2, 1994, now abandoned.

FIELD OF THE INVENTION

The present invention relates to the implementation of the call prompter/voice prompter feature for incoming International 800 Service. In general, the present invention permits all incoming calls to utilize any network based call routing menus and is particularly advantageous for international callers, who initiate calls on networks that do not permit user-network interaction before a call is answered. Such interaction is usually blocked by international signaling protocol standards.

BACKGROUND OF THE INVENTION

International 800 (I800) Service, introduced in 1984, provides callers with toll-free calling either to (inbound) or from (outbound) the U.S. Most of the Direct Services Dialing—Network Control Point (DSD-NCP) features offered to domestic 800 customers are also available to I800 service customers. Specifically, a DSD NCP is a large network database containing customer profile information. The profile information includes customer instructions regarding the handling of their calls, among other things. For example, the NCP stores the customer's preferred call routing and handling specifications. To comply with the customer's specifications, the DSD NCP must gather any additional information that may be needed, by instructing the switch to play appropriate announcements and collect digits, i.e., information gathered as a result of information provided by a caller.

However, the call prompter/voice prompter feature, which allows calls to be routed to one of several customer locations based upon receiving Dual Tone Multi-Frequency (DTMF) digits or voice responses to recorded announcements, is not available to I800 customers. Specifically, a call prompter relies upon DTMF to gather necessary information, while a voice prompter relies upon vocal inputs of the caller to gather necessary information. The voice prompter feature is especially important for calls originating in countries where touch-tone phones are not yet available in significant numbers.

Specifically, domestic 800 service, i.e., implementation of the CCS7 protocol (the protocol used by the United States in handling domestic telephone communications), requires the terminating switch to return an Address Complete Message (ACM), i.e., a confirmation to the preceding switch that the call has been received by the terminating switch and the terminating switch is proceeding, with the User-Network Interaction (UNI) indicator to the preceding switch before the DSD can be queried to determine whether additional information is necessary to complete the call in accordance with the customer's specifications. The preceding switch, on receiving the ACM, cancels the relevant timers and cuts through the two-way voice path. This enables the collection of additional information via user-network interaction by exchanging voice or in-band signalling information.

International signaling standards do not allow, in general, the pre-answer user-network interaction described above. Specifically, neither the CCITT #7 (C7) ISDN User Part (ISUP) protocol nor the C7 Telephone User Part (TUP) protocol allow user-network interaction via voice or in-band signalling until an ANswer Message (ANM) is received by the preceding switch, i.e., the foreign network gateway. The ANM acts to inform the preceding switch that the call has been answered, and that it is acceptable to open a two-way voice path.

In both C7 protocols, the ACM opens only the backward voice path. This is a fraud prevention mechanism, and the forward voice path opens only after the ANM has been sent. Hence, the existing international C7 protocols cannot adequately support any feature which requires user-network interaction prior to the ANM.

FIG. 1 discloses a high level network architecture. The network includes a foreign domestic network 10 where an initiating call originates. The call is transmitted through a Foreign Telecommunications Administrator (TA) Gateway 12 before entering the International Switching Center (ISC) 14 in the United States. The call is then passed to the terminating switch 16 (in the preferred embodiment, a terminating AT&T switch) and ultimately to the Local Exchange Carrier (LEC) 18. The signaling network is not explicitly shown in FIG. 1, and does not form part of the present invention.

If networks across a boundary have Signal Transfer Points (STPs), the signaling traffic is sent from STP to STP. Also, since both networks are equipped with network databases and are capable of launching Transaction Capabilities Application Part (TCAP) queries and responses, i.e., transactional dialog between a switch and a DSD NCP, subscriber specific service logic stored in the terminating network is capable of instructing the originating network to collect additional information from the caller.

Currently, a number of advanced DSD features are available to inbound I800 traffic, if a two-way voice path is created. For example, if the caller in the foreign country dials the appropriate free telephone number, the TA gateway switch converts the dialed number to 196-WXY-CCVZ or 196-WXY-VCCVZ. The Special Service Code (SSC) 196 identifies the service (I800), CC is pseudo country code and VWXYZ is the customer record index in the DSD NCP. The call prompter or voice prompter feature would then allow the customer to have a number of user options and destinations listed under the same free phone dialed number. Additional digits, i.e., information gathered as a result of DTMF or vocal information provided by the caller, obtained in response to prompts, could be used by the Network Control Point (NCP) to route the call to the proper destination. In the domestic network, the early ACM message, with UNI indicator, opens a two-way voice path enabling the feature to work. As explained above, this does not work in the C7 signaling protocols. For CCITT #5 (C5) and CCITT #R1 (R1) signaling standards, the two-way voice path may be available after the originating switch outpulses the dialed digits, however, the path is usually blocked.

The current inability to provide user-network interaction features to I800 customers is a serious limitation. In view of the foregoing discussion, a need exists for the provision of a method that will permit user-network interaction, specifically, call and voice prompters, to I800 customers. The present invention provides such a method for all signaling protocols.

BRIEF SUMMARY OF THE INVENTION

The shortcomings of the prior art are overcome by the present invention which comprises a system for facilitating a two-way voice path to permit access to call prompter/voice prompter services regardless of the signal protocols used in foreign networks and in the international links. The system includes switch means for receiving an initial address. The switch means include means for transmitting a query to a control point including subscriber service and network routing information, wherein the control point includes means for instructing the switch means to open a two-way voice path for user-network interaction. The switch means further including means for opening a two-way voice path after receiving instructions from the control point.

Other objects, advantages and salient features of the invention will become apparent from the following detailed description, which taken in conjunction with the annexed drawings, discloses the preferred embodiment of the present invention.

DETAILED DESCRIPTION OF THE PREFERRED EMBODIMENTS

Figure 1:
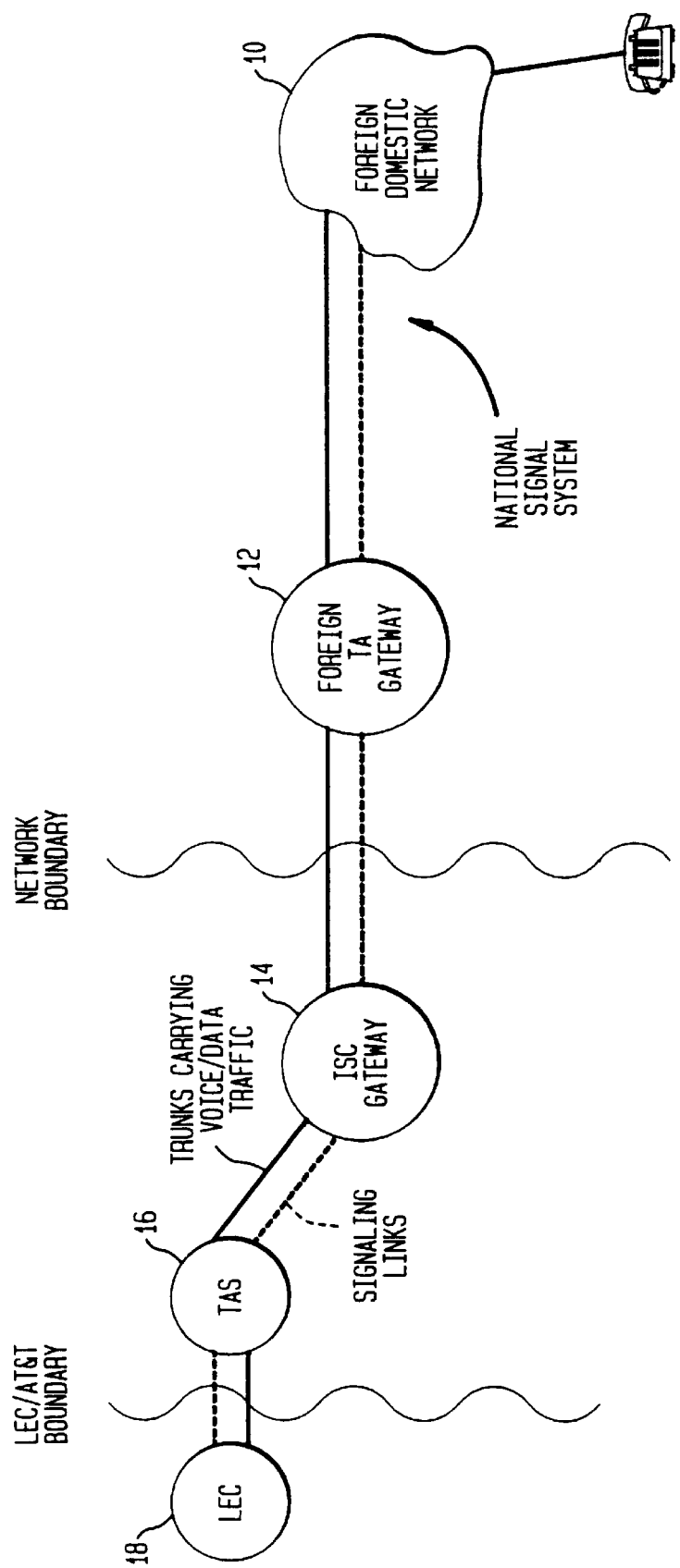
FIG. 1 is a schematic showing a high level network architecture.

The present invention is directed to a system for permitting all incoming calls to utilize user-network interaction features, and more particularly, to utilize network based call routing menus. The present invention is particularly advantageous to international callers initiating calls on networks that do not permit user-network interaction before a call is answered.

Briefly, the current call prompter/voice prompter feature allows callers to enter digits in response to a prompt, either vocally or by DTMF, for routing flexibility. The prompter feature may also be used to facilitate other user-network interactions. According to the present invention, the ISC Gateway Switch returns an early ANswer Message (ANM$_1$) to the foreign network when it receives a caller interaction indication from the DSD NCP. This opens a two-way voice path irrespective of the protocols used in the international links and foreign networks. The recording, billing and settlement impacts are addressed in the following description.

In developing the present system, the following assumptions have been made:

Some of the International signaling protocols (e.g., C7 ISUP) do not allow the forward voice-path cut through during the call set up phase. In these situations a method for allowing user-network interaction is essential to the proper function of the I800 feature.

Calls requiring "hand off" treatment will not receive the call prompter/voice prompter feature.

The method must work for C7 ISUP, C7, TUP, C5, AND R1 signaling systems between TA and ISC switches.

Specifically, a call from a foreign caller creates an Initial Address Message (IAM). The IAM is sent by the Foreign TA Gateway and is received by the ISC. The IAM (or address signaling) received by the ISC contains a network routing number with Special Service Code 196. In response to receiving the IAM, the ISC forms a TCAP query and sends it to the appropriate DSD NCP. If the customer logic demands additional information (may be supplied vocally or via DTMF) from the caller, for example, to make routing decisions, the DSD NCP instructs the ISC to play the customer specific announcement. The announcement is stored in the Network Service CompleX (NSCX) associated with the ISC. On receiving the TCAP message, "Play Announcement and Collect Digits or Voice Information", from the DSD NCP (see FIG. 2), the ISC simultaneously generates an early Answer Message (ANM$_1$) which opens two-way voice path irrespective of the protocols used in the international trunks and foreign networks, and plays appropriate announcements (i.e., prompt) to the caller. This overcomes barriers associated with different international protocols and permits access to the call prompter/voice prompter feature regardless of the international or domestic signaling protocols involved.

The International Calls Details Record (ICDR) records the time at which the ANM$_1$ is sent out. The system described above is intended to permit the gathering of routing information through the call prompter/voice prompter feature. However, the system could be used to permit user-network interaction for other purposes, without departing from the spirit of the present invention. In addition, although only English prompts have been utilized, it is possible to use languages other than English in the announcements.

If the announcement is not located in the NSCX collocated with the ISC, an Assist (AST) or "temporary connect" message is sent by the DSD NCP and the service assist software is invoked at the ISC. Upon receiving the command "temporary connect" (see FIG. 4) from the DSD NCP, the ISC launches an IAM to a subsequent "assist" switch. When the originating ACtion Point (ACP), i.e., the ISC in service assist state, receives an ANM from the subsequent switch, the ISC suppresses the incoming ANM and transmits an ANM to the TA if one has not already been sent out. The ISC could also send an ACM or its equivalent before it sends the ANM. Once the ANM is sent out, a two-way voicepath is created, digit collection begins, and subsequent call processing follows.

If allowed digits are not received or understood by the DSD NCP, a predetermined default treatment is given, e.g., the call is transferred to an operator. For example, if a person with a heavy accent provides information which the system does not understand, the call will be forwarded to an operator. The same procedure is followed if the caller refuses to provided information.

If the called party is free, the real ANM (ANM$_2$) with the correct called party category and status is sent back to ISC. Since an early ANM (ANM$_1$) was already sent to the foreign gateway, this "real" ANswer Message (ANM$_2$) cannot be sent (see FIG. 2). If the call is answered, the real connect time is recorded in the Automatic Message Accounting (AMA) record at the ISC.

If the call can not be completed, for example, if the customer's line is busy, a release signal with an appropriate cause value is sent back to the ISC. The value indicates the reason the call cannot be completed and the ISC plays an appropriate tone or announcement to the TA for several seconds, followed by a normal release message (see FIG. 3). For example, if the destination is busy, a specific cause value will be sent to the ISC. Then the ISC will create a busy signal for the TA and ultimately send a normal release message.

The method presented above includes a variety of advantages. First, the early answer message cuts through the two-way voice path no matter which signaling protocol is used in the network interconnect or in the foreign network. Additionally, no development is needed in the foreign network elements.

Figure 2:
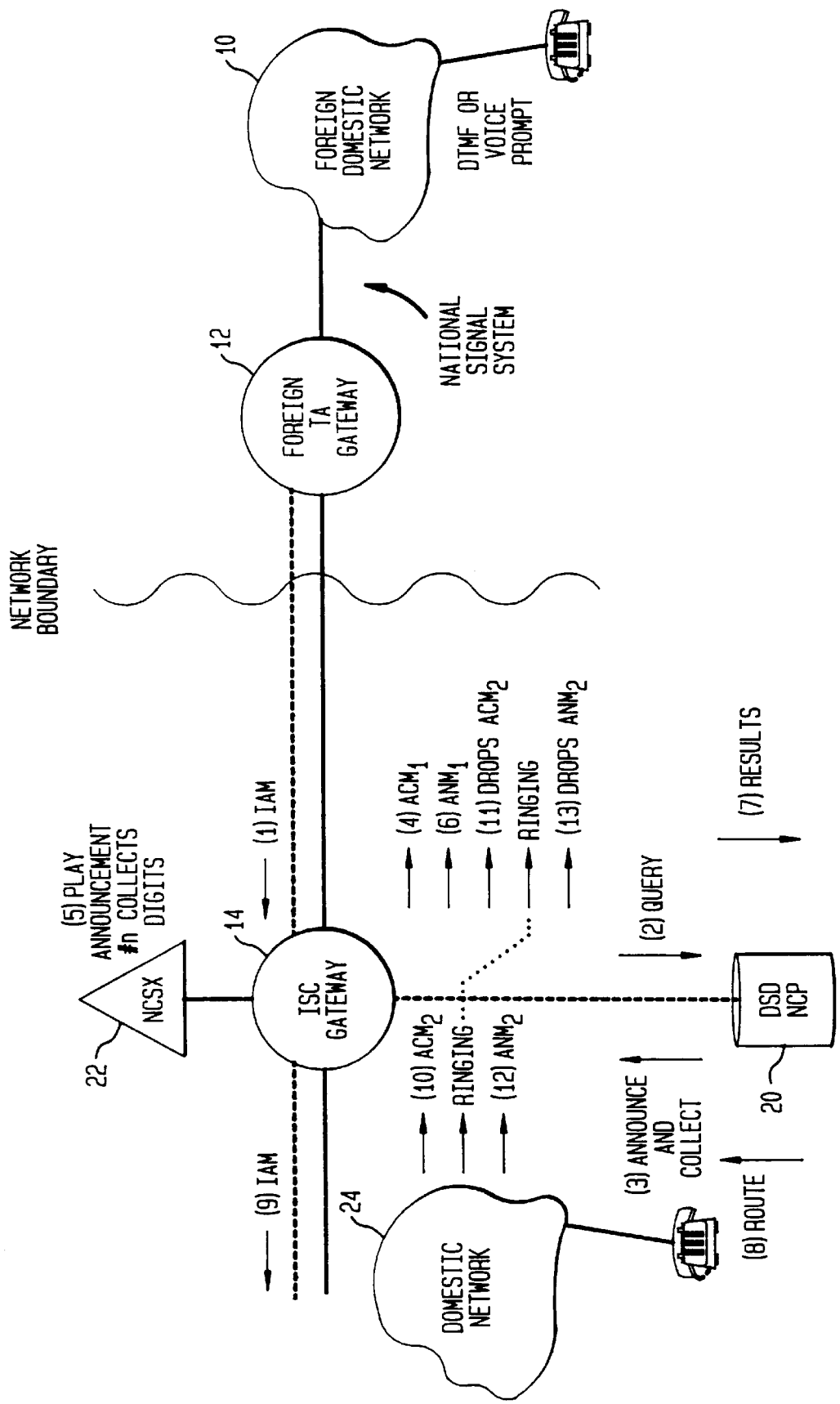
FIGS. 2, 3, and 4 are schematics showing the call flow associated with the call prompter/voice prompter feature in the case of C7 ISUP signaling connection between the TA and ISC switches.
Figure 3:
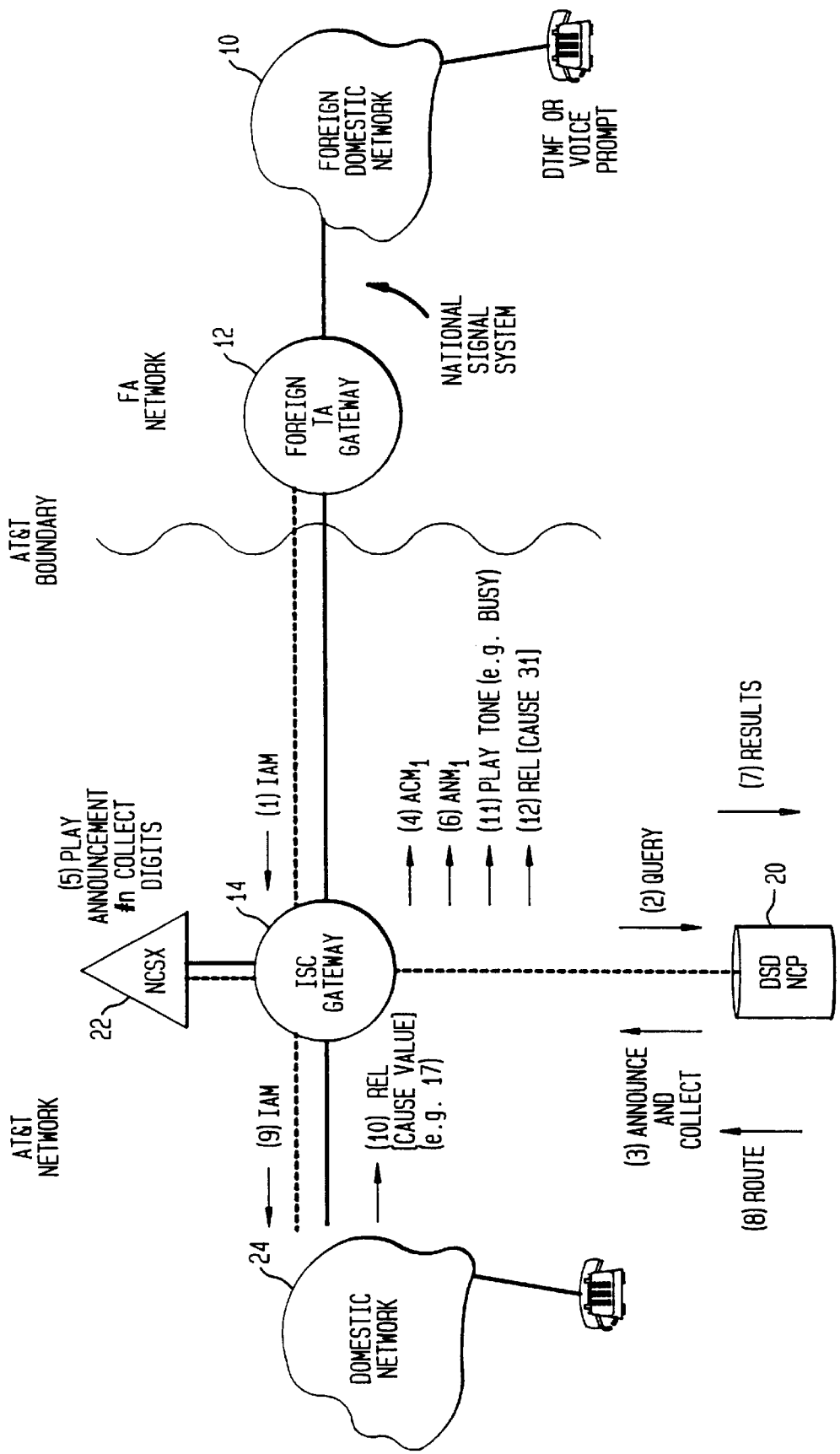
Figure 4:
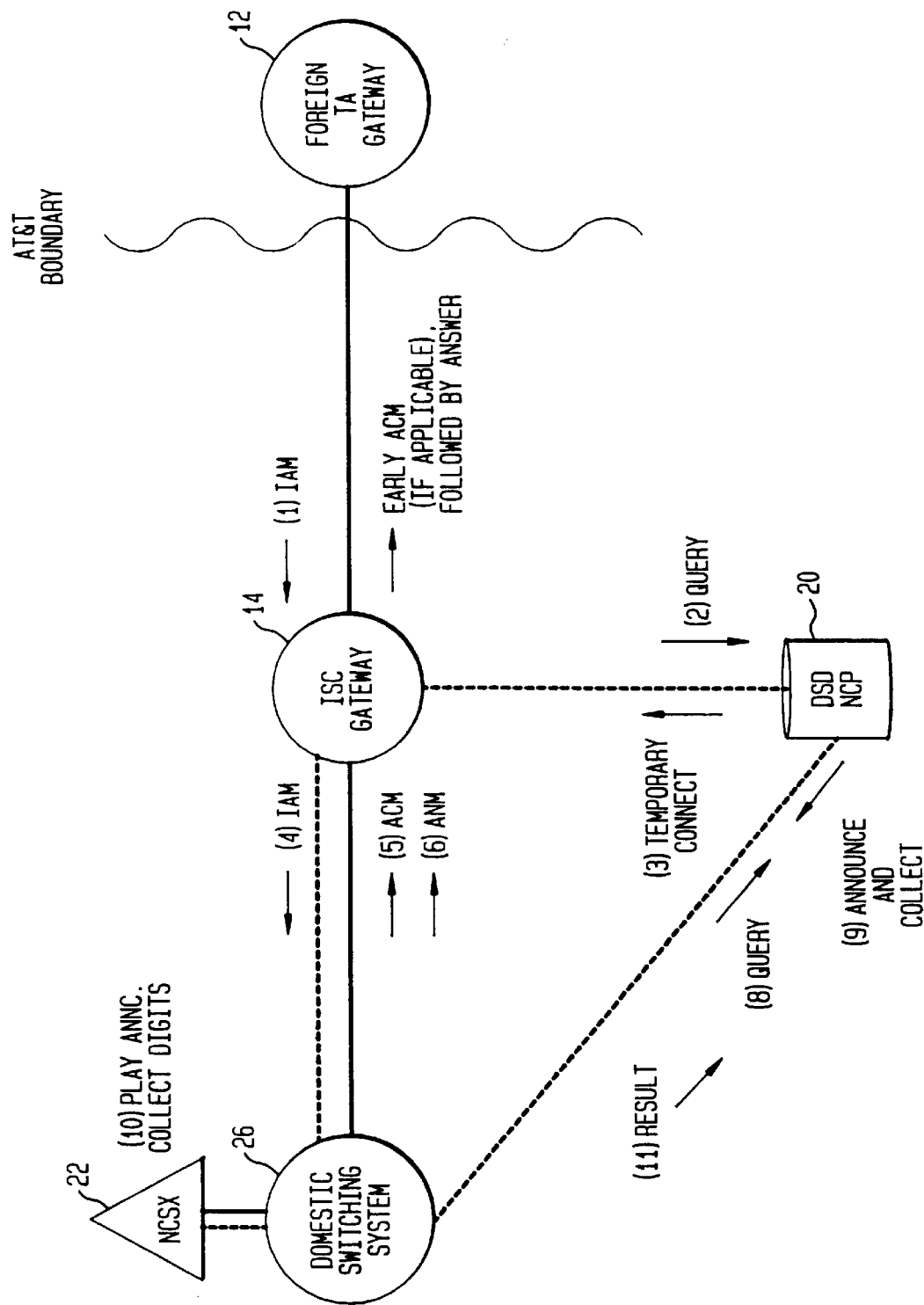

FIGS. 2, 3, and 4 show the call flow associated with the call prompter/voice prompter feature in the case of C7 ISUP signaling connection between the TA and ISC switches. The sequence of messages exchanged between the various network elements are shown as bracketed numerals.

FIG. 2 discloses a successful I800 prompter call, with no service assist required. After the initiation of a call from abroad, an Initial Address Message (IAM) is sent from the Foreign TA Gateway 12 to the ISC 14. The ISC 14 sends a query to the DSD NCP 20, which responds with an instruction to play an announce and collect message. This instruction directs the ISC 14 to simultaneously open an early Address Complete Message (ACM$_1$) and play announcement #n stored in the NSCX 22. The ANM$_1$ stops all timers and cuts through two-way voice paths independent of the protocols used. This creates the two-way voice path necessary for the use of the call prompter/voice prompter. The announcement is sent out by the ISC 14 to the Foreign TA Gateway 12 for response by the caller.

After the caller responds with the appropriate digits, i.e., information, the results are transmitted to the DSD NCP 20 and routing information is sent to the ISC 14. The ISC 14 sends an IAM to the domestic network 24 in accordance with the routing instructions provided by the DSD NCP 20. The IAM is then responded to by a final Address Complete Message (ACM$_2$).

If the IAM is received, the domestic network 24 transmits an ACM$_2$ to the ISC 14. After the ringing caused by the ACM$_2$ is transmitted to the ISC 14, the ACM$_2$ is suppressed as a result of the previously sent ACM$_1$. Finally, an ANM$_2$ is created and sent to the ISC 14, where the ANM$_2$ is suppressed because of the previous ACM$_1$. At this point the call is complete, and the caller is connected to the desired destination.

FIG. 3 shows a call termination resulting after the prompter feature has been completed. The termination is the result of the transmission of a release message, for example, with a cause value of 16 (indicating that the customer's line is busy), to the ISC from the domestic network. As FIG. 3 shows, steps 1–9 of the procedure are the same as those outlined in FIG. 2.

Beginning at step 10, the domestic network 24 sends a release message, e.g., the line is busy, to the ISC. As a result, the ISC 14 sends a tone signal (e.g., busy) and release message (e.g., cause 31 if the line is busy) to the Foreign TA Gateway 12. This terminates the call, which may be attempted again at a later date or time.

With reference to FIG. 3, it is important to understand that an appropriate tone is played by the ISC 14, which is followed by a release message. The appropriate tone and release message are sent when the ISC 14 receives a release message with a cause value other than 16 from the domestic network. Additionally, C7 protocol does not support backward disconnect after an ANM$_1$ is sent. As such, the ISC 14 must wait for the foreign network's disconnect or a reset from the C7 TUP protocol system.

FIG. 4 outlines the Service Assist Scenario. After the initiation of a call from abroad, an Initial Address Message (IAM) is sent from the Foreign TA Gateway 12 to the ISC 14. The ISC 14 sends a query to the DSD NCP 20, which responds with an instruction to temporarily connect with the domestic switching system 26. As a result, the ISC 14 sends an IAM to the domestic switching system 26. This is followed by the transmission of an ACM and ANM to the ISC.

The ISC 14 then sends an early ANM (i.e., ANM$_1$) to the Foreign TA Gateway 12 to open a two-way voice path. An early ACM may also be sent by the ISC 14 at this time. The early ACM and ANM are sent to the Foreign TA Gateway 12 after the ISC 14 receives an ANM from the domestic switching system 26 performing the service assist.

After the two-way voice path is created, the domestic switching system transmits a query to the DSD NCP 20 and receives an announce and collect digits message from the DSD NCP. This results in the ISC 14 causing the NSCX to "Play Announcement #n and Collect Digits", which is transmitted to the Foreign TA Gateway 12. Once the caller has input the appropriate information, the results are transmitted to the DSD NCP 20. Routing decisions are made by the DSD NCP 20 after the results of the digit collection process are received. The subsequent steps in the call processing are exactly the same as indicated in FIGS. 2 and 3.

Figure 5:
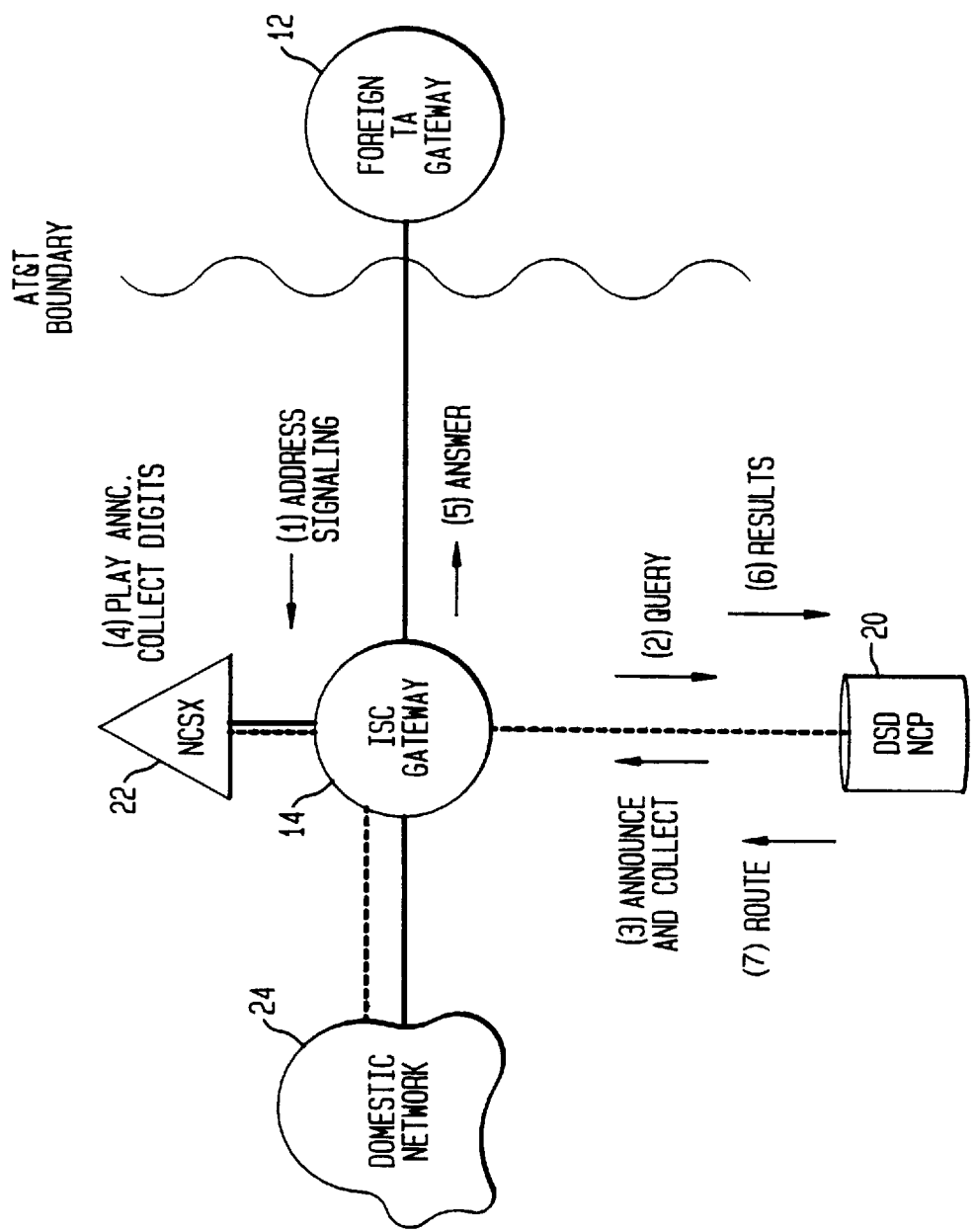
FIGS. 5 and 6 are schematics showing the case of MF signaling between TA and AT&T network without and with the need of service assist.
Figure 6:
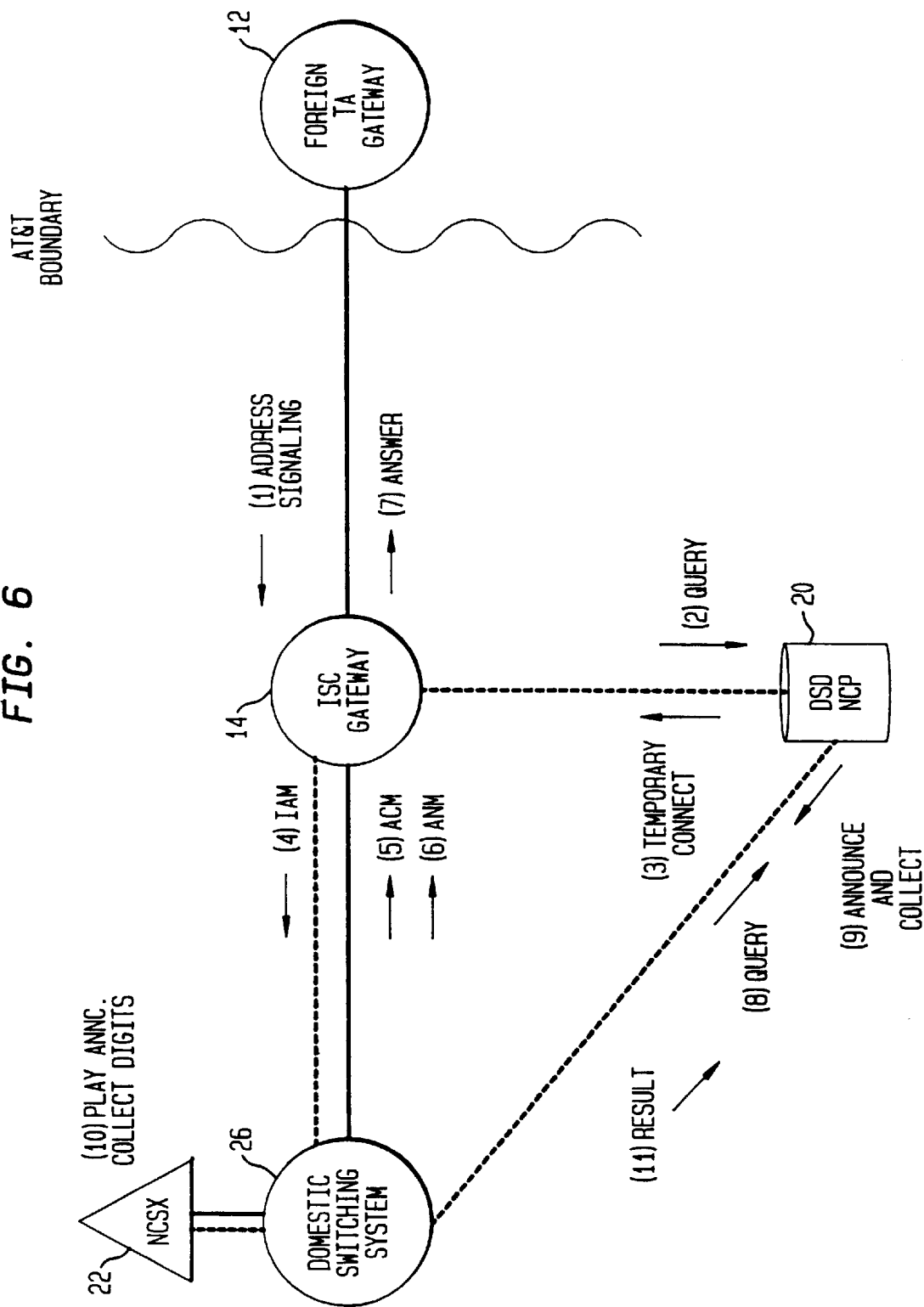

As a further illustration of the call prompter message flow, FIGS. 5 and 6 outline the case of Multi Frequency (MF) signaling between TA 12 and the domestic network without, and with, the need of the service assist scenario.

With reference to FIGS. 5 and 6, the procedure is identical to that outlined in FIGS. 2 and 4, respectively, with the exception the IAM of FIGS. 2 and 4 becomes address signaling, the ACM of FIGS. 2 and 4 becomes an answer indicating that all digits have been sent, and backward release becomes a message to clear back. This does not substantively affect the present invention, and the method can be performed with MF signaling without departing from the spirit of claimed invention.

Subsequent to the completion of the routing decision making procedure outlined in FIGS. 5 and 6, the call processing logic is exactly the same as show in FIGS. 2, 3, and 4.

The system disclosed above is preferably intended for use with AT&T equipment, including AT&T 4E switches. However, the system could be utilized with other equipment, without departing from the spirit of the invention.

With the is mind, the following discussion provides the preferred 4E switch requirements necessary to support the call prompter/voice prompter feature for I800 inbound voice calls. The main issue is how to insure the cut-through of the voice path in both directions after an IAM so user-network interactions can take place.

Depending on the signaling systems, the cut-through procedures are different. As stated previously, the switching system for some protocols do not completely cut-through the voice path in the forward direction before the answer message is received, i.e., the caller is able to receive, but not able to send any message via the speech path before the answer message is received. On the other hand, many signaling systems have the 2-way cut-through prior to the answer message.

In order to support the feature world wide, from a business point view, a signaling procedure should work with all possible international and national signaling systems.

The requirements in this document are only applicable to I800 inbound voice calls arriving at the ISC with an Special Service Code (SSC) of 196. The extension of the call prompter/voice prompter feature to other international services is possible, without departing from the spirit of the present invention.

The following switch requirements are applicable to AT&T I800 customers with all egress arrangements including direct connect customers, i.e., customers directly connected to a switch which has digital signaling. The following requirement apply to the I800 inbound voice calls using CCITT signaling systems R1, No. 5, No. 7 TUP, and No. 7 ISUP. The following requirements are not applicable to I800 inbound voice calls using C6 signaling protocol, although the switching requirements could be modified to accommodate C6 signaling protocol. This is because the C6 system is being phased out by the end of 1994.

For a I800 inbound voice call, the call prompter/voice prompter will be triggered if the 4E switch receives one of the following messages:

1) A TCAP message from the DSD NCP with the instruction, "Caller Interaction—Play Announcement and Collect Digits".
2) An ANM received from an assisting domestic switching system, when the Action Point switch, i.e., the 4E switch, is in service assist state.

After the call prompter/voice prompter is triggered, the 4E switch will send out an ANM. Depending on the signaling system, the actual message sent will vary. The details for various international signaling systems are provided in the following requirements.

For C7 TUP protocol, upon receiving a trigger, the 4E switch will immediately send an "early" Address Complete Message ($ACM_1$). At the start of the announcement, the 4E switch will send an "early" Answer Message ($ANM_1$). The "early" ANM will have the format as a C7 TUP ANM.

The "early" ACM will have the C7 TUP ACM format with the following Message Indicators:
bits BA: 0 1 address-complete signal, charge
bit C: 0 subscriber-free indicator, no indication
bit D: coded the same as received echo-suppressor indicator in the IAM.
(*For voice calls, it should be 1 in both directions, i.e. outgoing/incoming half echo suppressor included.)
bit E: 0 call not forwarded
bit F: 0 not all C7 Path
bits GH: 00 spare For C7-ISUP, upon receiving a call prompter trigger, the 4E switch will immediately send an "early" Address Complete Message ($ACM_1$). At the start of the announcement, the 4E switch will send an "early" Answer Message ($ANM_1$) with no optional parameters. Note that there is no mandatory parameter in an ANM.

In the "early" ACM, the backward call indicators, i.e, information regarding the capabilities and status of the called party sent back to the calling network, are mandatory and their values are listed as follows:
bits BA: Charge
bits DC Called party's status indicator 00 no indication
FE Called party's category indicator 00 no indication
bits HG: End-to-end method indicator 00 no end-to-end method available
bit I: Interworking indicator 1 interworking encountered
bit J: End-to-end information indicator 0 no end-to-end information available
bit K: ISDN User Part Indicator 0 ISDN User Part not used all the way
bit L: Holding indicator 0 holding not required
bit M: ISDN access indicator 0 terminating access non-ISDN
bit N: Echo control device indicator coded the same as in the received Nature of Connection Indicators
bits P O: SCCP method indicator 00 no indication The "early" ACM does not include the optional backward call indicators.

For I800 call prompter/voice prompter feature, if there is information related to the supplementary services e.g. user service information, closed user group, and user-to-user information (UUI) in the incoming IAM, it will be discarded. There is no new signaling requirement on discarding the above mentioned information.

For international non-common channel signaling systems (R1, C5), upon receiving a call prompter trigger, there will be no "early" ACM; instead, the 4E switch will only send the "early" Answer Message, which will be the same as an answer message defined by the signaling system protocol in use.

Inbound I800 uses the same structures as domestic 800. That is, calls are recorded using the same structure codes as that used for domestic 800 calls. The structures are:
1DSD-based calls: 1144–1147, 1350–1353
2DSD-based calls: 1144–1147, 1350–1353, 1354–1357.

It should be noted that 1144–1147 are the basic structures; 1350–1357 are used when automatic number identification, i.e., information regarding the callers' telephone number, is forwarded to the called party and/or queuing is used; 1354–1357 are used when Feature Routing Enhanced Dynamically (FRED), i.e., a flexible system for routing calls, features are used on the call.

In conjunction with the present invention, the 4E switch will record an early answer time and a real answer time (remember that an early ANM is sent out to create the two-way voice path). The two different times will be differentiated on the Answer Event by setting Bit 22 of Word 2 to "0" for Real Answer Time and to "1" for Early Answer Time. Details of the Answer Event is documented below under Call Detail Recording Platform (CDRP) requirements.

The sending time of the "early" ANM will be recorded in the International Call Detail Record (ICDR). The location of the timing information is as stated below and in Appendix A.

There is no new requirement for the AMA records. Note that since ICDR and AMA records will not be compared downstream, no conflict will result from the early answer time recorded in ICDR and true answer time recorded in the AMA records. ICDRs are used to settle with foreign TAs; AMA records are used to bill I800 customers.

After sending the "early" Answer Message (or Signal) to a foreign network, the 4E switch will clear the call by sending a clear-back signal or a release message with a cause value, whichever is proper for the international signaling system. Handling of the normal release will remain the same.

If a user busy condition is encountered, the 4E switch will handle the call using the existing logic, except what is specified in the following for the international trunks:

1) For C7 TUP, C5, and R1, without the arrival of a clear-forward signal from the foreign TA, the 4E switch will send a clear-back signal to the foreign partner.
2) For C7 ISUP, the 4E switch will not send a release signal immediately.

Next, the 4E switch must generate and deliver the slow (60 HZ) busy tone to the foreign network for a time interval as currently adopted by the 4E switch for all supported protocols.

For a C7 ISUP trunk, at the end of the busy tone, without the arrival of the release message from the foreign TA, a release message with cause value 31 will be sent from the 4E switch.

With regard to the following matters there are no new requirements peculiar to the present invention: ICDR; Automatic Message Accounting (AMA) Recording; Operations, Administration, and Maintenance (however, in order for the feature to work, the MF trunks to international destinations must be marked as international trunks).

With regard to Call Detail Record Platform (CDRP), the 4E switch will send events to the CDRP to record a call. For this feature, the 4E switch will send 2 ANM events to the CDRP. The first answer event will be the early ANM event, which will be used to record the ICDR. The second ANM event will be the REAL-Time answer event, which will be used to record the AMA.

If the CDRP receives only one answer event and Bit 22 of Word 2 is set to "0", then CDRP will record both AMA and ICDR with this Answer event. If the CDRP receives one Answer event and Bit 22 of Word 3 is set to "1", then CDRP will record the ICDR.

If the call is answered, then the 4E switch will send another ANM event, where bit 22 of Word 2 will be set to "0" following the above Answer Event. This event will be used to record the AMA.

On receipt of a charging call, the 4E switch will make an AMA record. The answer event is as shown in Appendix A While the preferred embodiment of the present invention has been shown and described, it will be understood that it is not intended to limit the disclosure, but rather it is intended to cover all modifications alternate methods falling within the spirit and scope of the invention as defined in the appended claims or their equivalents.

APPENDIX A

| Event ID: | ANS |
|---|---|
| Event Code: | 7 |
| Secondary Event Code: | 66 |
| Length | 6 |
| Purpose: | Provides a positive indication that a call was answered and the time of answer. |
| Call Processing Trigger(s): | Upon receipt of answer supervision. |
| Applicable Generics: | 4E18 and beyond. |
| Comments: | This event is also used to create ICDR records. |

```
         31     28 27   24 23    20 19 16 15  12 11   8 7    4 3    0
     0  |A|B|C|D|  0  |  111  |x|secondary event code| xx |  length  |
     1  |   0    |  0  |   BCSN   |x|         incoming TSN           |
     2  |   0    |  0  | I|E|A|day| xx |         answer date         |
     3  |   0    |  0  |  xxx   |            answer time             |
     4  |   0    |  0  |           100 ms answer snap                |
     5  |   0    |  0  | <─────────────────── x ──────────────────>  |
     6  |   0    |  0  |  E  |  E  |  E  |  E  |  E  |  E  |
```

| Word | Bit Positions | Field Name | Field Description | Field Assignments |
|---|---|---|---|---|
| 0 | 31 | A | ignore event | 0 = do not ignore |
|   |    |   |              | 1 = ignore |
|   | 30 | B | TERM notification indicator | 0 (not TERM msg) |
|   | 29 | C | old (pre-4E18) Trunk Status event | 0 (not old TS event) |
|   | 28 | D | invalid length | 0 = length correct |
|   |    |   |                | 1 = length incorrect |
|   | 27–24 | x | unused bits | 0 |
|   | 23–21 | event.code |  | 111b |
|   | 20 | x | unused bits | 0 |
|   | 19–8 | secondary.code | secondary event code value | 000001000010b=66d |
|   | 7–6 | x | unused bits | 0 |
|   | 5–0 | length |  | 000110b=6d |
| 1 | 23–18 | BCSN | Billing Call Sequence Number | 1–63d (random) |
|   | 17 | x | unused bit | 0 |
|   | 16–0 | TSN | Trunk scanner number | ICT |
| 2 | 23 | I | INUP COLI | 0 = COLI was received |
|   |    |   |           | 1 = COLI was not received |
|   |    |   |           | ⁻(in INUP Answer msg) |
|   | 22 | E | Early Time Stamp | 0= Real Time |
|   |    |   |                  | 1= Early Time |
|   | 21 | A | Answer time stamp error | 0 = no error |
|   |    |   |                         | 1 = error |
|   | 20–18 | day | answer day of week - ICDR | 0 = Sunday |
|   |       |     |                           | 1 = Monday |
|   |       |     |                           | 2 = Tuesday |
|   |       |     |                           | 3 = Wednesday |
|   |       |     |                           | 4 = Thursday |
|   |       |     |                           | 5 = Friday |
|   |       |     |                           | 6 = Saturday |
|   |       |     |                           | 7 = unassigned |
|   | 17–16 | x | unused bits | 0 |
|   | 15–0 | answer.date |  |  |
|   | bits 15–9 |  | last 2 digits in year | binary 0-99d |
|   | bits 8–0 |  | day of year | binary 1-366d |
| 3 | 23–21 | x | unused bits | 0 |
|   | 20–0 | answer.time |  |  |

| | | | -continued | |
|---|---|---|---|---|
| | | bits 20–18 | 4 hr. increments | binary 0-5d |
| | | bits 17–15 | ½ hr. increments | binary 0-7d |
| | | bits 14–9 | ½ minute increments | binary 0-59d |
| | | bits 8–4 | number of seconds | binary 0-29d |
| | | bits 3–0 | number of 1/10s of seconds | binary 0-9d |
| 4 | 23–0 | 100ms.snap | 100 ms answer snap | binary |
| 5 | 23–0 | unused bits | 0 | |
| 6 | 23–0 | E | delimiters | 1110b = Eh |

I claim:

1. A system for facilitating a two-way voice path on a call from an originating location through an originating network and a destination network to a called destination using pre-answer interaction to permit access to user-network interaction features, regardless of signaling system protocol of the originating network where the voice path is blocked at the interface between the originating network and the destination network, comprising:

switch means for receiving an initial address, the switch means including means for transmitting a query to a network control point including subscriber services information, the network control point including means for instructing the switch means to open a two-way voice path for user-network interaction;

the switch means further including means for opening a two-way voice path after receiving instructions from the network control point.

2. The system according to claim 1, wherein the two-way voice path is created by sending an early answer message to the originating network.

3. The system according to claim 2, wherein the switch means further includes means for connecting the originating network with a called destination.

4. The system according to claim 3, wherein the switch means further includes means for terminating the two-way voice path if the called destination is unavailable.

5. The system according to claim 1, wherein the network control point further includes means for directing the switch means to gather additional information from a caller.

6. The system according to claim 5, further including a prompt means collocated with the switch means for gathering additional information from the caller.

7. The system according to claim 6, wherein the two-way voice path is created when additional information is required, the two-way voice path being created by sending an early answer message to the originating network.

8. The system according to claim 7, wherein the network control point includes means for making routing determinations and for transmitting routing instructions to the switch means.

9. The system according to claim 8, wherein the switch means further includes means for connecting the originating network with a called destination based upon routing instructions received from the network control point.

10. The system according to claim 9, wherein the switch means further includes means for terminating the two-way voice path if the called destination is not available.

11. The system according to claim 7, further including an announcement storage unit collocated with the switch means, the announcement storage unit retaining announcements to be played to a caller when the network control point instructs the switch means that additional information is necessary.

12. The system according to claim 11, further including assist means for obtaining the additional information when a proper announcement is not found within the announcement storage unit collocated with the switch means.

13. The system according to claim 12, wherein the network control point includes means for making routing determinations and for transmitting routing instructions to the switch means.

14. The system according to claim 13, wherein the switch means further includes means for connecting the originating network with a called destination based upon routing instructions received from the network control point.

15. The system according to claim 14, wherein the switch means further includes means for terminating the two-way voice path if the called destination is unavailable.

16. The system according to claim 1, further including a prompt means collocated with the switch for gathering additional information from the caller.

17. A method for facilitating a two-way voice path on a call from an originating location through an originating network and a destination network to a called destination using pre-answer interaction to permit user-network interaction where the voice path is blocked at the interface between the originating network and the destination network, comprising the steps of:

receiving an initial address from an originating network having system protocols;

determining whether user-network interaction is necessary; and opening a two-way voice path when user-network interaction is necessary.

18. The method according to claim 17, wherein the two-way voice path is opened by sending an early answer message to the originating network.

19. The method according to claim 18, wherein a network control point determines whether user-network interaction is necessary and instructs a first switch to send the early answer message when user network interaction is necessary.

20. The method according to claim 19, wherein determining includes evaluating whether additional information is necessary to complete a call.

21. The method according to claim 20, wherein the additional information is routing information.

22. The method according to claim 20, further including the steps of sending an announcement requesting information to a caller and using information supplied by the caller to make necessary decisions.

23. The method according to claim 22, further including the step of contacting an assist switch if the announcement is not available to the first switch.

24. The method according to claim 17, wherein a network control point determines whether user-network interaction is necessary and instructs a first switch to send the early answer message when user network interaction is necessary.

25. The method according to claim 24, wherein determining includes evaluating whether additional information is necessary to complete a call.

26. The method according to claim 25, further including the steps of sending an announcement requesting information to a caller and using information supplied by the caller to make necessary decisions.

27. The method according to claim 26, further including the step of contacting an assist switch if the announcement is not available to the first switch.

28. The method according to claim 25, wherein the additional information is routing information.

29. The method according to claim 17, further including the step of terminating the two-way voice path when a called destination is not available.

30. The method according to claim 28, wherein a signal indicative of the reason the called destination is unavailable is sent when the two-way voice path is terminated.

31. A system for facilitating a two-way voice path on a call from an originating location through an originating network using international signalling protocol and a destination network to a called destination to permit access to user-network interaction features, regardless of signaling system protocol of the originating network where the voice path is blocked at the interface between the originating network and the destination network, comprising:

switch means for receiving an initial address, the switch means including means for transmitting a query to a network control point including subscriber services information, the network control point including means for instructing the switch means to open a two-way voice path for user-network interaction;

the switch means further including means for opening a two-way voice path after receiving instructions from the network control point.

32. A method for facilitating a two-way voice path on a call from an originating location through an originating network using international signalling protocol and a destination network to a called destination to permit user-network interaction where the voice path is blocked at the interface between the originating network and the destination network, comprising the steps of:

receiving an initial address from an originating network having system protocols;

determining whether user-network interaction is necessary; and opening a two-way voice path when user-network interaction is necessary.

* * * * *